Patented May 3, 1938

2,116,469

UNITED STATES PATENT OFFICE 2,116,469

PROCESS FOR REMOVING CARBIDES AND OTHER IMPURITIES FROM SLAGS

Ernst Karwat, Grosshesselohe, near Munich, Germany, assignor, by mesne assignments, to Union Carbide and Carbon Corporation, a corporation of New York No Drawing. Application October 24, 1936, Serial No. 107,369. In Germany October 21, 1932

6 Claims. (Cl. 106—25.5)

The invention relates to the manufacture of slag-cement having the approximate composition and hydraulic properties of Portland cement. More particularly the invention is a method of treating molten slags of Portland cement composition to remove certain impurities normally found in such slags when they are produced, simultaneously with pig iron or the like, by direct smelting in a blast furnace.

Portland cement usually has the approximate chemical composition (by proximate analysis):

$CaO$—60% to 65%
$MgO$—up to 3%
$Fe_2O_3$—2% to 5%
$Al_2O_3$—5% to 10%
$SiO_2$—20% to 25%

Blast furnace slags produced in the ordinary processes of manufacture of pig iron have the approximate chemical composition:

$CaO$—40% to 45%
$MgO$—5% to 10%
$Al_2O_3$—10% to 20%
$SiO_2$—35% to 40%

Customarily, slag-cement of the Portland type is produced from such blast furnace slags either by grinding the solid slag with proper added proportions of slaked lime and possibly other ingredients; or by calcining the ground slag with limestone and possibly other ingredients; or by adding to the molten slag, and melting into it, lime and possibly other ingredients. Each of these methods has for its object to bring about a substantial change in the chemical composition and hydraulic properties of the original blast furnace slag, so that the ultimate product shall have the approximate composition and hydraulic properties of Portland cement.

Recently it has been found that under certain conditions slag of approximately Portland cement composition can be produced directly in blast furnaces simultaneously with the smelting of pig iron or the like. Generally speaking, this is accomplished by greatly increasing the proportion of limestone in the charge, and increasing the hearth temperature of the furnace. As the melting point of such a "Portland cement slag" is about 1900° C., as compared with a melting point of about 1400° C. to 1500° C. for ordinary blast furnace slag, it is evident that if a slag of true Portland cement composition is to be produced, the hearth temperature of the furnace must be increased to a temperature far above normal blast furnace temperatures. Such a high temperature can be attained by expedients such as the use of oxygen-enriched blast. It has been found that slag-cement produced under such high temperature conditions usually contains a considerable proportion—sometimes two or three percentum—of calcium carbide, an impurity not ordinarily found in cement of any type produced by methods other than the one just described.

Calcium carbide, when present in cement in such large proportion, is extremely objectionable because when the cement is slaked the calcium carbide reacts with water to evolve acetylene, which is dangerous because of its inflammable properties, and may ruin the cement casting by producing porosity. If slag-cement of the Portland cement type is to be produced successfully by the direct smelting method, means for eliminating or destroying the calcium carbide contained in it must be provided.

The present invention is based upon my discovery that certain salts of the metals of the alkali and alkaline earth groups, when added to the molten slag-cement in relatively small proportions, effectively destroy and render harmless the calcium carbide contained in the slag-cement, without otherwise substantially altering either its composition or its hydraulic properties. Substances which I have found effective for this purpose are the halides, carbonates and sulphates of the alkali metals and alkaline earth metals.

For example, a sample of slag-cement which contained about 2% of calcium carbide was treated in the molten state with 4% by weight of sodium chloride, and a similar sample was treated with about 4% by weight of magnesium chloride. In each instance, calcium carbide could not be detected in the treated slag-cement, though untreated material evolved gas in copious quantities when moistened with water. Similar samples of slag-cement, treated in the molten state with calcium fluoride, sodium carbonate, and calcium sulphate, likewise showed substantially complete elimination of calcium carbide by the treatment.

The reaction of the salts with the calcium carbide of the slag is extremely rapid and complete, and it is sufficient to add the salts to the liquid slag on tapping, shortly after its separation from the metal. Most of the salts and their products of reaction are volatile and therefore have no influence on the hydraulic properties of the slag.

If the slag is well granulated with air, it is not necessary to destroy all of the calcium carbide by adding salts. In such a case it is sufficient to decompose only a part of the carbide with salts and to oxidize the remainder in the granulating step.

While the invention has been described in connection with the removal of calcium carbide from directly-smelted slag-cements of the Portland type, I have found that calcium phosphide is also sometimes present in such slag-cements in objectionably large proportions, and that the method of the invention is likewise effective in destroying or rendering harmless calcium phosphide contained in such slag-cement.

This application is in part a continuation of my United States patent application Serial No. 693,398, filed October 12, 1933.

I claim:

1. Process for treating iron blast furnace molten slag containing an amount of carbide in excess of that which can be destroyed by air granulation of the slag, which process comprises adding to the molten slag after its separation from the metal a carbide-destroying salt chosen from the group consisting of the halides, carbonates, and sulfates of the alkali and alkaline earth metals, the amount of said added salt being enough to destroy said excess carbide but not substantially more than enough to destroy all of the carbide in the slag.

2. Process as defined in claim 1 in which the salt is a chloride.

3. Process as defined in claim 1 in which the salt is sodium chloride.

4. Process as defined in claim 1 in which the salt is magnesium sulphate.

5. Process as defined in claim 1 in which the salt is calcium carbonate.

6. Process as defined in claim 1 in which the slag is granulated with air and the quantity of salt added to the slag is less than is sufficient alone to decompose the carbide content of the slag.

ERNST KARWAT.